United States Patent
Honma

(10) Patent No.: US 7,995,463 B2
(45) Date of Patent: Aug. 9, 2011

(54) TRANSMISSION DEVICE

(75) Inventor: Hiroyuki Honma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 12/216,378

(22) Filed: Jul. 2, 2008

(65) Prior Publication Data

US 2009/0129262 A1    May 21, 2009

(30) Foreign Application Priority Data

Jul. 4, 2007   (JP) .................................. 2007-176177

(51) Int. Cl.
*G01R 31/08*   (2006.01)
*H04L 12/66*   (2006.01)
*H04J 3/22*   (2006.01)

(52) U.S. Cl. ......... 370/217; 370/355; 370/466; 709/224

(58) Field of Classification Search ......... 370/216–218, 370/225, 242, 244, 245, 351–356, 464–467; 709/220, 221, 223, 224, 238, 239
See application file for complete search history.

(56) References Cited

U.S. PATENT DOCUMENTS

| 6,487,169 | B1 * | 11/2002 | Tada .............................. 370/219 |
| 6,756,898 | B2 | 6/2004 | Ikematsu |
| 7,315,511 | B2 | 1/2008 | Morita et al. |
| 7,397,760 | B2 * | 7/2008 | Bamba .......................... 370/219 |
| 2006/0274782 | A1 | 12/2006 | Rikitake |

FOREIGN PATENT DOCUMENTS

| JP | 2000-151674 | 5/2000 |
| JP | 2002-026956 | 1/2002 |
| JP | 2003-018196 | 1/2003 |
| JP | 2003-110585 | 4/2003 |
| JP | 2003-134074 | 5/2003 |
| WO | WO 2005/079015 | 8/2005 |

* cited by examiner

*Primary Examiner* — Aung S Moe

(74) *Attorney, Agent, or Firm* — Staas & Halsey LLP

(57) ABSTRACT

A transmission device includes a synchronous transmission network interface section, a switch section, first and second LAN interface sections, a distribution section, and a transmission and reception section, and said second LAN interface section includes a de-mapping section, a transmission and reception section, a collection section, and a mapping section.

16 Claims, 13 Drawing Sheets

TRANSMISSION DEVICE

CROSS-REFERENCE TO RELATED APPLICATIONS

This application is based upon and claims the benefit of priority from the prior Japanese Patent Application No. 2007-176177 filed on Jul. 4, 2007, the entire contents of which are incorporated herein by reference.

BACKGROUND

1. Field

The present invention relates to a synchronous transmission device and to, for example, a SONET EOS (Ethernet® over SONET) termination device and its peripheral device.

2. Description of the Related Art

An EoS technique is known as a technique for building a complex network. In one such complex network, an Ethernet® network is linked to a Synchronous Optical Network (SONET) network. In another such complex network, an Ethernet network is linked to a Synchronous Digital Hierarchy (SDH) network. Further, a Path Protection technique is employed in a transmission device constituting a SONET network or an SDH network. The Path Protection technique protects communication by switching the paths at the time of a link failure or a device failure. In recent years, a Protection (redundancy) function has been required to be installed for the connection line to an Ethernet® device connected to a SONET network or an SDH network.

FIG. 1 is a diagram showing an exemplary configuration of a packet switch (Packet SW) device applied to an Ethernet® network (referred to as a packet network, hereinafter). The packet switch device includes a plurality of interface cards accommodating a plurality of Ethernet® lines (E-lines, hereinafter). The Ethernet lines are connected to a packet switch. Each interface card and the packet switch are connected through a packet interface such as a System Packet Interface (SPI). The packet switch performs switching operation on a packet basis.

FIG. 2 is a diagram showing an exemplary configuration of a SONET transmission device or an SDH transmission device (generically referred to as a SONET device, hereinafter). As shown in FIG. 2, the SONET device is constructed by connecting a plurality of interface cards accommodating a plurality of lines to a SONET switch. Here, each interface card in the SONET device and the SONET switch are connected through a SONET interface (e.g., the STS12 format). Switching operations are performed in the SONET switch on a time slot basis.

Here, for the purpose of realization of a redundant configuration (Ethernet® Protection) in a packet network, collection and distribution need be performed on a packet basis. Thus, for the purpose of realization of a protection function (redundant configuration) between interface cards in a SONET device, the SONET switch needs to process on a packet basis. Nevertheless, the SONET switch that performs switching operations on a time slot basis cannot perform switching on a packet basis.

Thus, a protection function between interface cards has been difficult to realize in existing SONET devices. Here, the above-mentioned protection function may be realized by installing a packet switch function in the SONET switch. Nevertheless, adding functions by installing a packet switch into an existing SONET switch (existing hardware constructed as a switch card) can cause an increase in the cost or an increase in the power consumption in the SONET device.

SUMMARY

According to an aspect of an embodiment, a device comprises a synchronous transmission network interface section, a switch section connected to the synchronous transmission network interface section, and first and second LAN interface sections respectively connected to the switch section, wherein the first LAN interface section includes a de-mapping section for de-mapping a signal which is inputted from the switch section and in which packets are mapped and thereby obtaining packets from the signal, a distribution section for distributing the packets obtained in the de-mapping section to first and second paths, a transmission and reception section that transmits and receives packets to and from the packet network and includes a first transmission and reception port for transmitting the packets arriving through the first path to the packet network, and a mapping section that maps both of the packets received from the packet network through the first transmission and reception port and the packets distributed to the second path into the signal, and then sends the signal to the switch section, wherein the second LAN interface section includes a de-mapping section that de-maps the signal which is inputted from the switch and in which the packets from the packet network are mapped and the signal in which the packets distributed to the second path are mapped, then sends the packets distributed to the second path to a third path and sends the packets from the packet network to a fourth path, a transmission and reception section that transmits and receives packets to and from the packet network and includes a second transmission and reception port for transmitting the packets arriving through the third path to the packet network, a collection section for collecting the packets received from the packet network through the second transmission and reception port and the packets sent to the fourth path, and a mapping section for mapping the packets collected by the collection section into the signal and then sending the signal to the switch section, and wherein when no failure is present in both of the first and second LAN interface sections, the switch section transfers the signal received from the synchronous transmission network by the synchronous transmission network interface section to the de-mapping section of the first LAN interface section, transfers both of the signal which is inputted from the mapping section of the first LAN interface section and in which the packets from the packet network are mapped and the signal in which the packets distributed to the second path are mapped to the de-mapping section of the second LAN interface section, and transfers the signal inputted from the mapping section of the first LAN interface section to the synchronous transmission network interface section.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
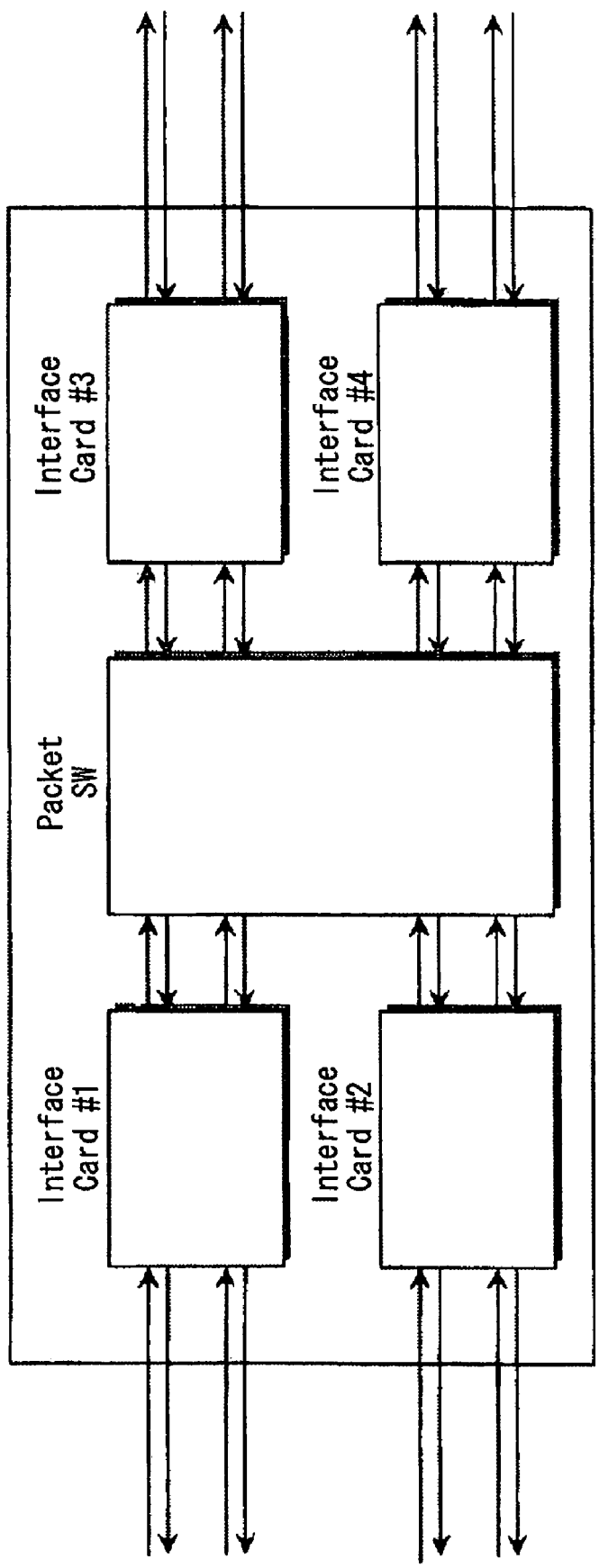
FIG. 1 is a diagram showing an exemplary configuration of a packet switch device.
Figure 2:
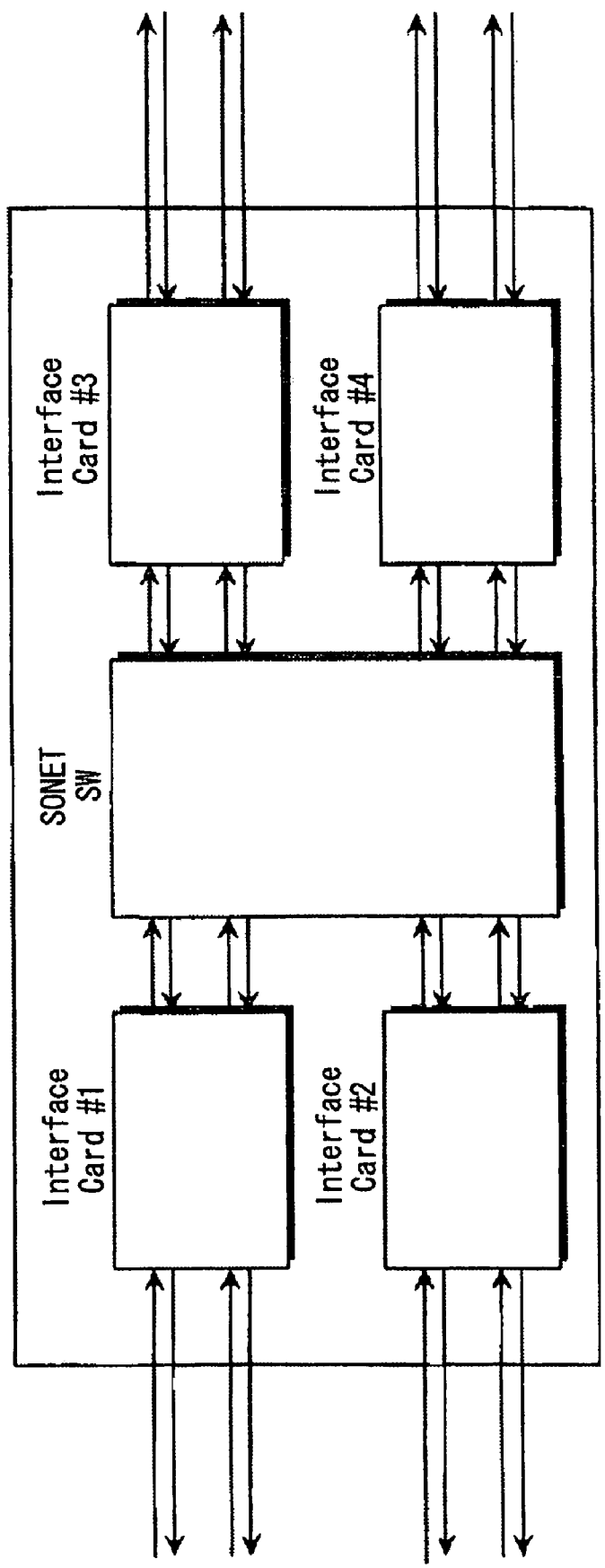
FIG. 2 is a diagram showing an exemplary configuration of a SONET device.

Reference may now be made in detail to embodiments of the present invention, examples of which are illustrated in the accompanying drawings, wherein like reference numerals refer to like elements throughout.

Figure 3:
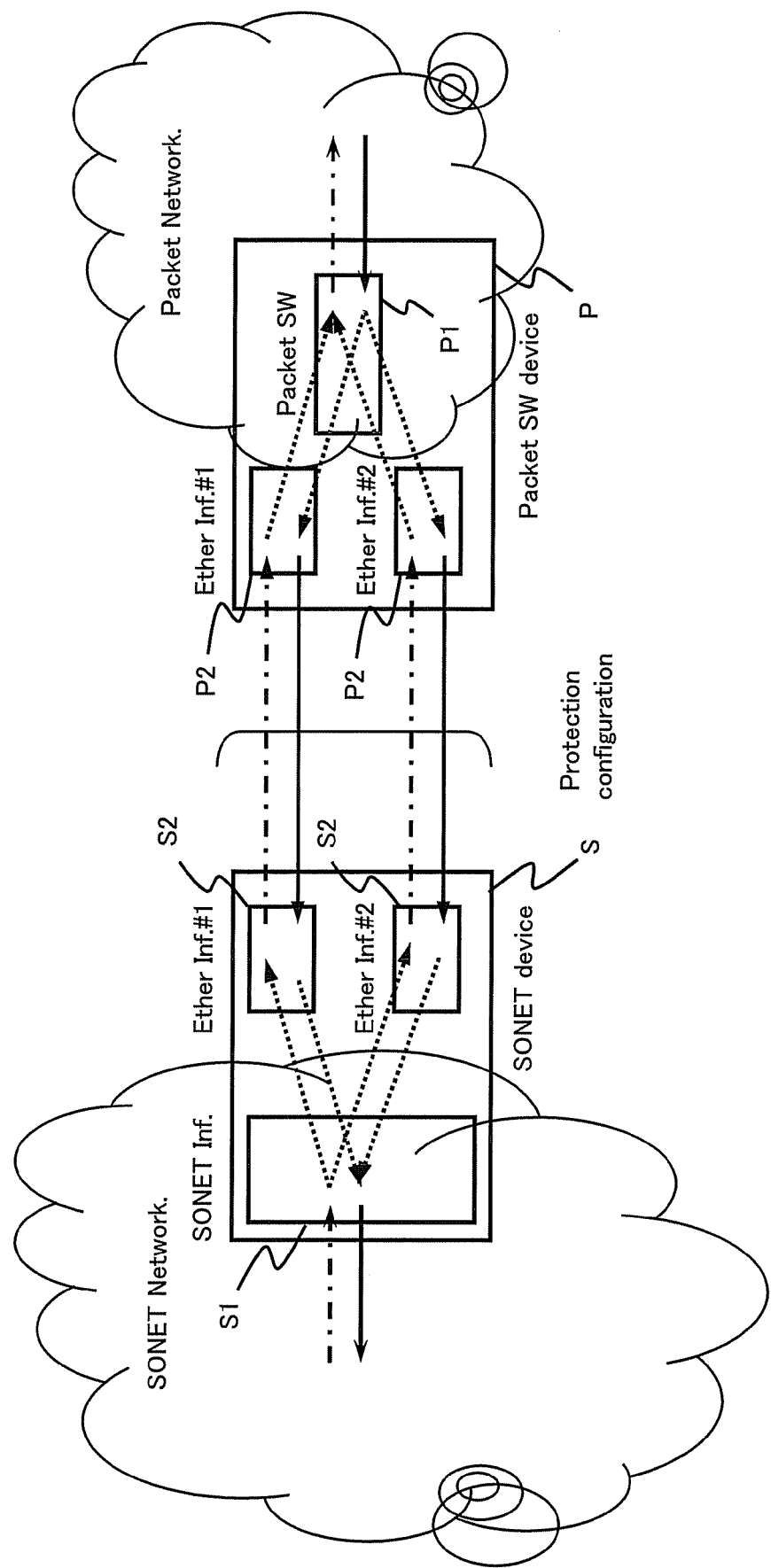
FIG. 3 is a diagram showing an example of a network configuration of a complex network in which a SONET network or an SDH network is connected to a packet network.

FIG. 3 is a diagram showing an example of a network configuration having a redundant configuration in which a SONET network or an SDH network (generically referred to as a SONET network, hereinafter) is connected to a packet network. As shown in FIG. 3, when a SONET network and a packet network are connected to each other, one of the packet switch devices in the packet network (Packet SW device P) is connected to one of the SONET devices in the SONET network (SONET device S).

The packet switch device P has a packet switch P1 and a plurality (two in FIG. 3 (#1 and #2)) of Ethernet® interface cards P2 (referred to as "E-IF cards", hereinafter). On the other hand, the SONET device S has: E-IF cards S2 (#1 and #2) corresponding to the packet switch device P; and a SONET interface card S1.

The E-IF cards P2 (#1 and #2) of the packet switch device P are connected to the E-IF cards S2 (#1 and #2) of the SONET device S. Packets from the packet network are mapped (converted) into an EOS signal in each E-IF card S2 (#1 and #2) of the SONET device S. Then, the signal is inputted to the SONET interface card S1. On the other hand, the EOS signal outputted from the SONET interface card S1 is converted (de-mapped) into packets (EOS function) in each E-IF card S2 (#1 and #2).

Since the E-IF cards P2 and the E-IF cards S2 are connected respectively, the packet switch device P and the SONET device S are connected through two bidirectional E-lines. The transmission band can be used effectively in a normal state if the two E-lines are treated as a single logical line by using an Ethernet link aggregation (Ethernet® Link Aggregation) function. On the other hand, when a failure occurs in any one of the E-lines (paths), communication can be protected (attainment property for the packets can be compensated) by rerouting the packets. The packets that were transmitted and received through the line on the side where the failure is present can be rerouted to the line on the side where no failure is present.

Figure 4:
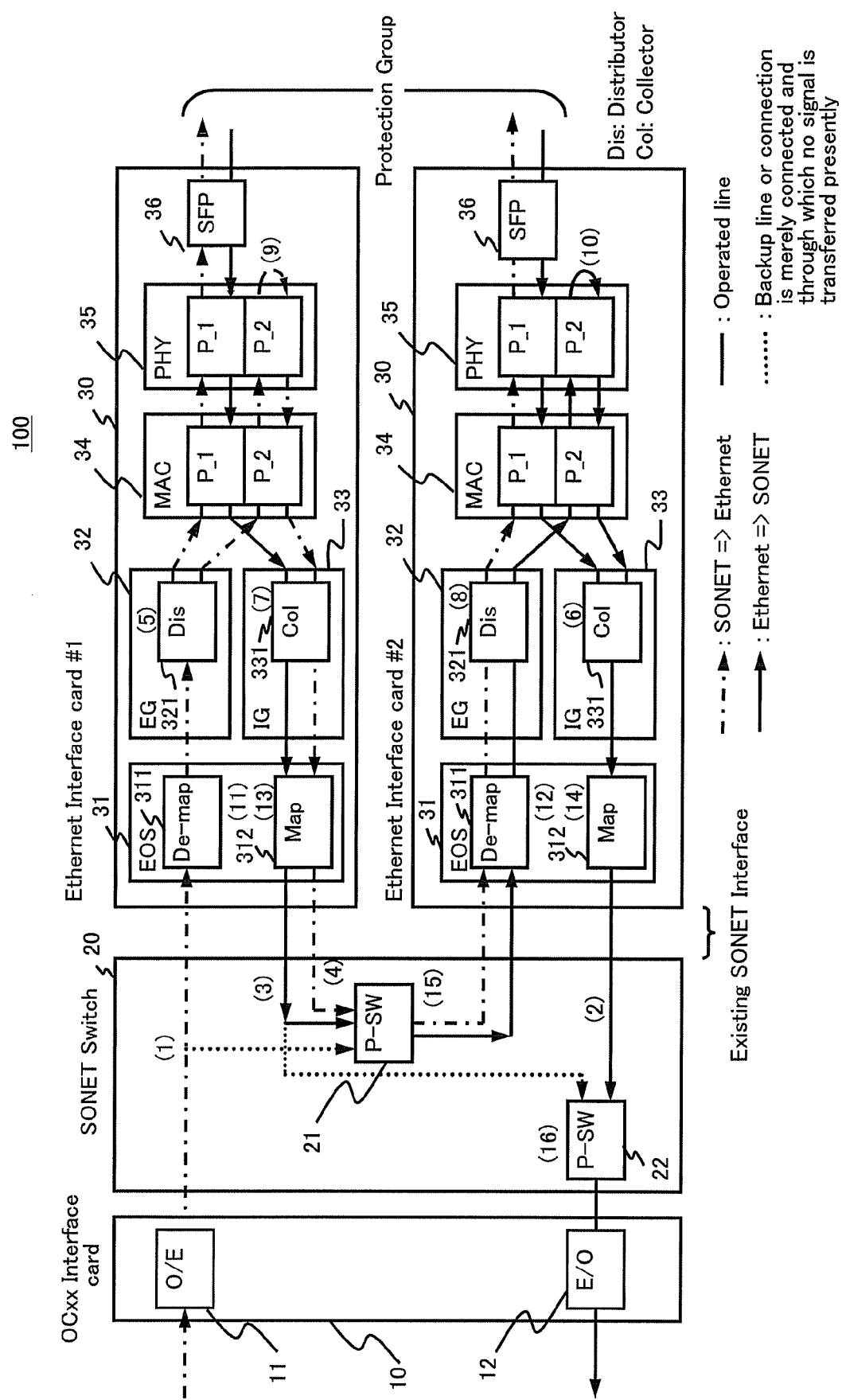
FIG. 4 is a diagram showing an exemplary configuration (two-port configuration) of a SONET device according to a first embodiment.

FIG. 4 is a diagram showing an exemplary configuration of the SONET device S shown in FIG. 3. In FIG. 4, the SONET device 100 corresponding to the SONET device S includes: an OCxx interface card 10 (corresponding to the SONET/SDH interface section) corresponding to the SONET interface S1 shown in FIG. 3; a SONET switch 20 (SONET/SDH switch section: corresponding to the switch section); and a plurality (two in this example) of E-IF cards 30 (#1 and #2: corresponding to the first and the second LAN interface sections).

The OCxx interface card 10 has an interface for the SONET network, and performs termination of the line and the section of the SONET. Further, the OCxx interface card 10 has an O/E (optical/electric) conversion device 11 and an E/O conversion device 12.

The SONET switch 20 has a SONET Cross Connect function and a SONET Path Switch function. In FIG. 4, the SONET switch 20 has two path switches (SONET P-SWs) 21 and 22.

The E-IF card 30 has an EOS (Ethernet Over SONET) section 31, an EG (Egress block) section 32, an IG (Ingress block) section 33, a MAC (Media Access Control) section 34, a PHY section 35, and an SFP (Small Form-Factor Pluggable) section 36. The E-IF card 30 performs the functions of Ethernet® interface, packet distribution/collection, EOS (Ethernet Over SONET), and the like.

The EOS section 31 is a functional part that performs processing concerning the EOS. As the EOS function, the EOS section 31 has: a de-mapping section 311 that performs de-mapping processing on the EOS signal so as to obtain packets from an EOS signal; and a mapping section 312 that maps packets into an EOS signal.

The EG section 32 is an output processing part of the SONET network, and has a distribution section (distributor) 321 for distributing the packets sent from the EOS section 31. The IG section 33 is an input processing part of the SONET network, and is a collection section (collector) 331 that performs collection processing of collecting the packets on a packet basis.

The MAC section 34 is a MAC layer processing part for managing the MAC layer processing for the packets. The MAC section 34 has two ports P_1 and P_2. The PHY section 35 is a physical layer processing part for managing the physical layer processing for the packets. The PHY section 35 also has two ports P_1 and P_2.

The SFP section 36 serving as a transmission and reception section has: an O/E conversion function of converting an optical signal from the packet switch device into an electric signal (FIG. 3); and an E/O conversion function of converting an electric signal from the PHY section 35 into an optical signal and then sending the converted signal to the packet switch device.

Each block described above is connected as follows. That is, the signal from the O/E conversion device 11 is connected to one of the de-mapping section 311 of the E-IF card #1 or the path switch 21 ((1) in FIG. 4) by virtue of the Cross Connect function of the SONET switch 20.

Further, one of the output from the mapping section 312 of the E-IF card #1 or the output of the mapping section 312 of the E-IF card #2 is connected to the path switch 22 by virtue of the Cross Connect function of the SONET switch 20. ((2) and (3) in FIG. 4)

Further, the output destination for the signal from the E-IF card #1 is switched between the path switch 21 and the path switch 22 by virtue of the Cross Connect function of the SONET switch 20 ((2), (3), and (4) in FIG. 4). The others are connected through the physical wiring in each of the E-IF cards #1 and #2.

In a normal state (in which no failure is present in both of the E-IF card sections #1 and #2), the SONET device 100 is in the following state. That is, processing is invalidated in the collection section (Packet Collector) 331 ((7) in FIG. 4) of the E-IF card #1 and the distribution section (Packet Distributor) 321 ((8) in FIG. 4) of the E-IF card #2, while the collection section 331 and the distribution section 321 perform passing-through for the inputted packets.

Further, the path switch 21 ((15) in FIG. 4) is a SONET Path Switch for selecting one of the path (the signal from the OCxx interface card 10) of (1) in FIG. 4 or the paths (the signals from the E-IF card #1) of (3) and (4) in FIG. 4. In a normal state, the path switch 21 selects the paths (the signals from the E-IF card #1) of (3) and (4).

Further, the path switch 22 is a SONET Path Switch for selecting one of the path (the signal from the E-IF card #1) of (3) in FIG. 4 or the path (the signal from the E-IF card #2) of (2) in FIG. 4. In a normal state, the path of (2) is selected.

Next, with reference to FIG. 4, description is given for the flow of the signal (EOS signal) from the SONET network and the signal (E-packets) from the packet network in a normal state of the SONET device 100.

The flow of the signal from the SONET network is described below.

In a normal state, the Ethernet® Over SONET (EOS) signal inputted to the OCxx interface card 10 is connected to the E-IF card #1 by virtue of the Cross Connect function ((1) in FIG. 4) of the SONET switch 20.

The de-mapping section 311 of the EOS section 31 in the E-IF card #1 de-maps the EOS signal into Ethernet® (E-packet) packets. The E-packets obtained by the de-mapping are distributed to the two path directions (first and second paths) by the distribution section 321 of the EG section 32.

The E-packets distributed to the first path are inputted to the port P_1 of the MAC section 34. The E-packets inputted to the port P_1 go through the port P_1 of the PHY section 35, then reach the SFP section 36 (first transmission and reception port). The E-packets are then outputted to the E-line #1. As a result, the E-packets are transferred to the opposing packet switch device (e.g., the packet switch device P in FIG. 3).

Further, the E-packets distributed to the second path are inputted to the port P_2 of the MAC section 34, then go through the port P_2 of the PHY section 35. The E-packets are then inputted again into the port P_2 of the PHY section 35 through a return connection ((9) in FIG. 4) set up in advance in this port P_2. The E-packets are then inputted through the port P_2 of the MAC section 34 to the collection section 331 ((7) in FIG. 4) of the IG section 33.

Passing-through for the E-packets is performed in the collection section 331. The E-packets are inputted to the mapping section (EOS Mapping block: (13) in FIG. 4) 312 of the EOS section 31. The E-packets are converted into an EOS signal by the mapping section 312. The E-packets then go through the path of (4) by virtue of the Cross Connect function of the packet switch 20. The E-packets are then connected to the E-IF card #2 through the path switch 21.

The EOS signal is inputted to the de-mapping section 311 ((12) in FIG. 4) of the EOS section 31 in the E-IF card #2. The EOS signal is then de-mapped into E-packets. After that, the E-packets are sent to the third path that goes from the de-mapping section 311 to the SFP section 36. The E-packets sent to the third path are inputted to the distribution section 321 ((8) in FIG. 4) of the EG section 32.

The distribution section 321 of the E-IF card #2 passes the E-packets through. Then, the E-packets are inputted to the port P_1 of the MAC section 34 on the third path. After that, the E-packets go through the port P_1 of the PHY section 35. Then the E-packets reach the SFP section 36 (second transmission and reception port), and are sent out through the E-line #2.

As described above, the EOS signal inputted to the OCxx interface card 10 is de-mapped into E-packets, then distributed to the E-IF card #1 and the E-IF card #2. The EOS signal is then outputted to two E-lines.

The packets inputted from the packet network are described below.

The E-packets inputted to the E-IF card #2 go through the SFP section 36 (second transmission and reception port), the port P_1 of the PHY section 35, and the port P_1 of the MAC section 34. The E-packets are then inputted to the collection section 331 ((6) in FIG. 4) of the IG section 33.

On the other hand, the E-packets received from the packet network by the SFP section 36 (first transmission and reception port) of the E-IF card #1 go through the port P_1 of the PHY section 35 and the port P_1 of the MAC section 34. The E-packets are then inputted to the collection section 331 ((7) in FIG. 4) of the IG section 33. The collection section 331 passes the E-packets through, and then the E-packets are mapped into an EOS signal by the mapping section 312 ((13) in FIG. 4) of the EOS section 31. Then, the EOS signal is inputted through the path of (3) in FIG. 4 to the path switch 21 by virtue of the Cross Connect function of the SONET switch 20. The EOS signal is then inputted through the path switch 21 to the de-mapping section 311 ((12) in FIG. 4) of the E-IF card #2.

After that, the EOS signal is de-mapped into E-packets by the de-mapping section 311. The E-packets obtained by the de-mapping are sent from the de-mapping section 311 to the fourth path leading to the collection section 331. The E-packets sent to the fourth path are inputted to the distribution section 321 of the EG section 32. The distribution section 321 passes the E-packets through so as to input the E-packets to the port P_2 of the MAC section 34 on the fourth path.

The E-packets inputted to the port P_2 go through the port P_2 of the PHY section 35. The E-packets are then inputted again into the port P_2 of the PHY section 35 through a return connection ((10) in FIG. 4) set up in advance in this port P_2. The E-packets then go through the port P_2 of the MAC section 34. The E-packets then reach the collection section 331 of the IG section 33. As such, the E-packets received by the E-IF card #1 and the E-packets received by the E-IF card #2 merge with each other in the collection section 331 of the E-IF card #2.

The collection section 331 collects the E-packets from the E-IF card #1 and the E-packets received by the E-IF card #2, and then inputs the packets into the mapping section 312 ((14) in FIG. 4) of the EOS section. The mapping section 312 maps the E-packets into an EOS signal, and then sends out the EOS signal. The SONET switch 20 connects the EOS signal through the path of (2) in FIG. 4 ((2) in FIG. 4) to the path switch 22 ((16) in FIG. 4). The path switch 22 transfers the EOS signal to the OCxx interface card 10. The transferred EOS signal undergoes E/O transform processing performed by the E/O conversion device 12, and is then sent to the SONET network.

As a result, the E-packets received by the E-IF card #1 and the E-IF card #2 are collected on a packet basis by the collection section 331, and then mapped into an EOS signal. The EOS signal is outputted from the OCxx interface card 10 via the SONET switch 20.

The operation performed at the time of a link failure in the E-IF card #1 is described below.

Figure 5:
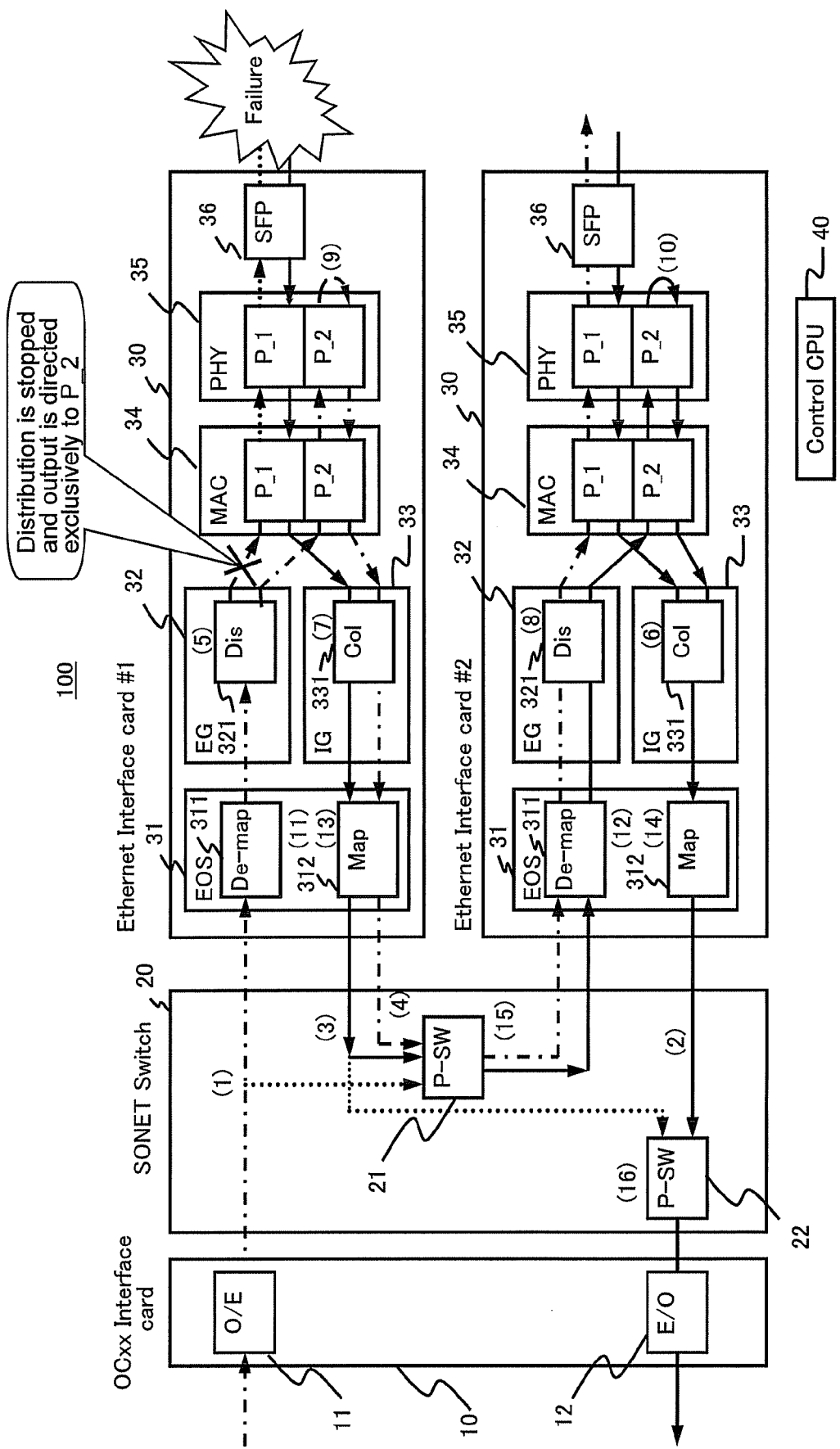
FIG. 5 is a diagram showing an example of operation in a case that a link failure occurs in an E-IF card #1 provided in a SONET device shown in FIG. 4.

FIG. 5 is a diagram showing an example of operation when a link failure occurs in an E-IF card #1 provided in a SONET device shown in FIG. 4. FIG. 5 shows a state in which the E-line (link) for connecting the packet switch device (FIG. 3) to the E-IF card #1 is disconnected. Such a link failure is detected by, for example, a control CPU 40 that is installed in the SONET device 100 and that controls the operation of the SONET device.

The control CPU 40 sets up the distribution section 321 ((5) in FIG. 5) of the EG section 32 of the E-IF card #1 to stop the distribution and output the E-packets to the port P_2 of the MAC section 34 when a link failure in the E-IF card #1 is detected. As a result, the E-packets which were outputted from the E-IF card #1 before the occurrence of the link failure are outputted from the E-IF card #2.

Further, the E-packets which were inputted to the E-IF card #1 before the occurrence of a link failure are inputted from the port P_2 of the MAC section 34 to the collection section 331 ((6) in FIG. 5) of the E-IF card #2. In contrast, when a link failure occurs, such input from the port P_2 disappears. However, similarly to the state before the failure occurrence, the E-packets received by the E-IF card #2 are inputted from the port P_1 of the MAC section 34 to the collection section 331.

Thus, setting change for the collection section 331 is not performed, and hence the collection processing by the collection section 331 is not invalidated. That is, since the collection section 331 has been collecting E-packets from both of the E-IF cards #1 and #2 from the beginning, the collection operation need not be changed even when the E-packet input from the E-IF card #1 disappears. Here, the individual blocks other than the distribution section 321 perform operation similar to that in a normal state.

As described above, communication with the packet switch device P (FIG. 3) can be continued through the link (E-line #2) of the E-IF card #2 when a link failure occurs in the E-IF card #1. Here, in this case, the packet switch device P stops the packet transmission to the E-IF card #1, and sends the E-packets to the E-IF card #2.

After that, at the time of restoration from the link failure, the distribution section 321 of the E-IF card #1 temporarily stops the distribution processing for the packets. Then, after a predetermined time has elapsed, the distribution section 321 restarts the distribution to the two path directions. Such control is performed, for example, in accordance with an instruction from the control CPU 40. The predetermined time is determined by, for example, a user.

The operation performed at the time of a link failure in the E-IF card #2 is described below.

Figure 6:
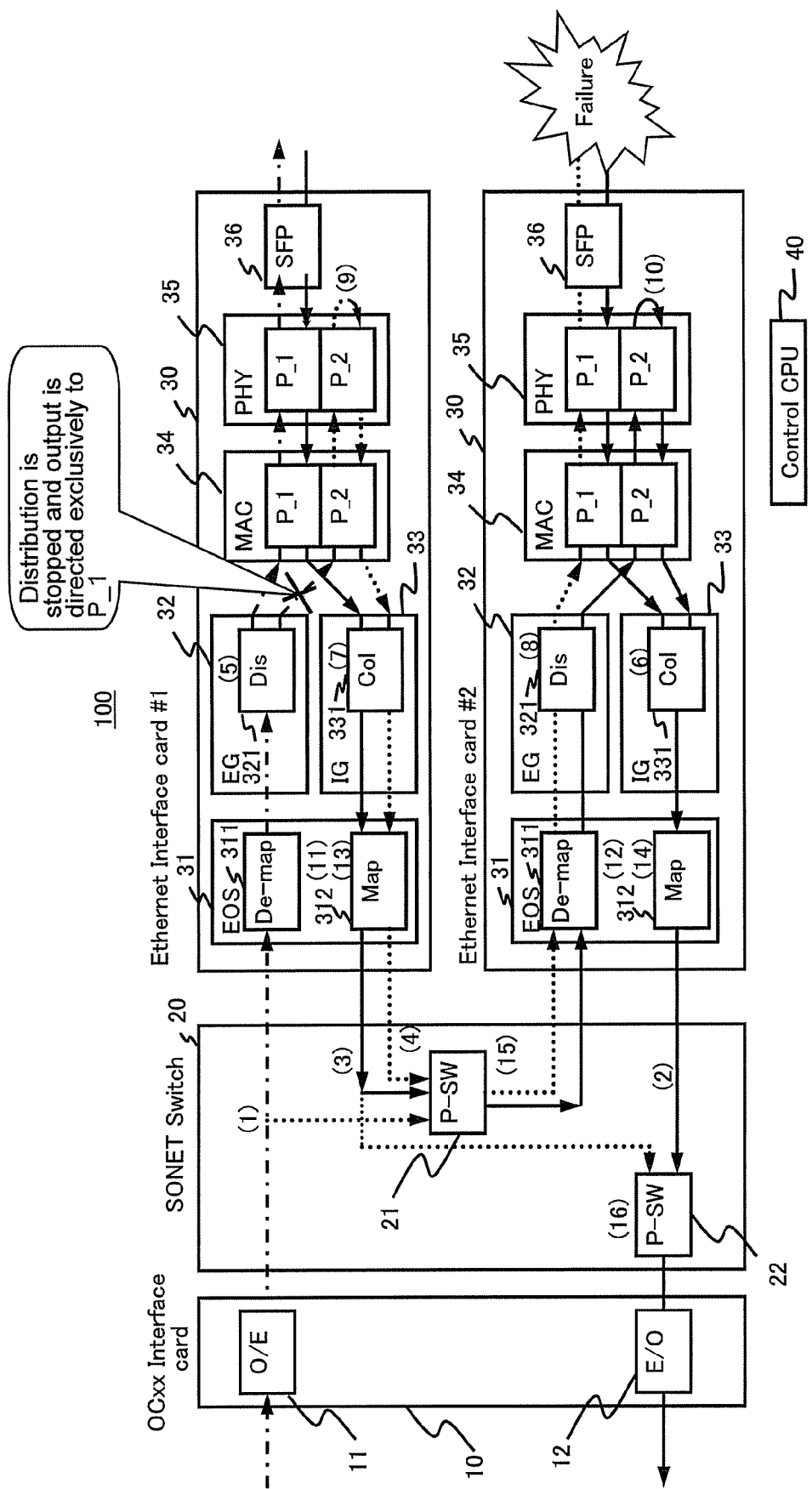
FIG. 6 is a diagram showing an example of operation in a case that a link failure occurs in an E-IF card #2 provided in a SONET device shown in FIG. 4.

FIG. 6 is a diagram showing an example of operation when a link failure occurs in an E-IF card #2 provided in the SONET device shown in FIG. 4. In FIG. 6, the control CPU 40 sets up the distribution section 321 ((5) in FIG. 6) of the E-IF card #1 to stop the distribution and send the E-packets to the port P_1 of the MAC section 34 when a link failure is detected in the E-IF card #2. This causes transition into a state that the E-packets that were outputted from the E-IF card #2 before the occurrence of the link failure are outputted from the E-IF card #1.

Further, the E-packets that were inputted to the E-IF card #2 before the occurrence of a link failure are inputted from the port P_1 of the MAC section 34 to the collection section 331 ((6) in FIG. 5) of the E-IF card #2. In contrast, when a link failure occurs, such input from the port P_1 disappears. However, similarly to the state before the failure occurrence, the E-packets received by the E-IF card #1 are inputted from the port P_2 of the MAC section 34 to the collection section 331.

Thus, setting change for the collection section 331 is not performed, and hence the collection processing by the collection section 331 is not invalidated. That is, since the collection section 331 has been collecting E-packets from both of the E-IF cards #1 and #2 from the beginning, the collection operation need not be changed even when the E-packet input from the E-IF card #2 disappears. Here, the individual blocks other than the distribution section 321 perform operation similar to that in a normal state.

As described above, communication with the packet switch device P (FIG. 3) can be continued through the link (E-line #1) of the E-IF card #1 when a link failure occurs in the E-IF card #2. Here, in this case, the packet switch device P stops the packet transmission to the E-IF card #2, and sends the E-packets to the E-IF card #1.

After that, at the time of restoration from the link failure, the distribution section 321 of the E-IF card #1 temporarily stops the distribution processing for the packets. Then, after a predetermined time has elapsed, the distribution section 321 restarts the distribution to the two path directions. Such control is performed, for example, in accordance with an instruction from the control CPU 40. The predetermined time is determined by, for example, a user.

The operation performed at the time of a device failure in the E-IF card #1 is described below.

Figure 7:
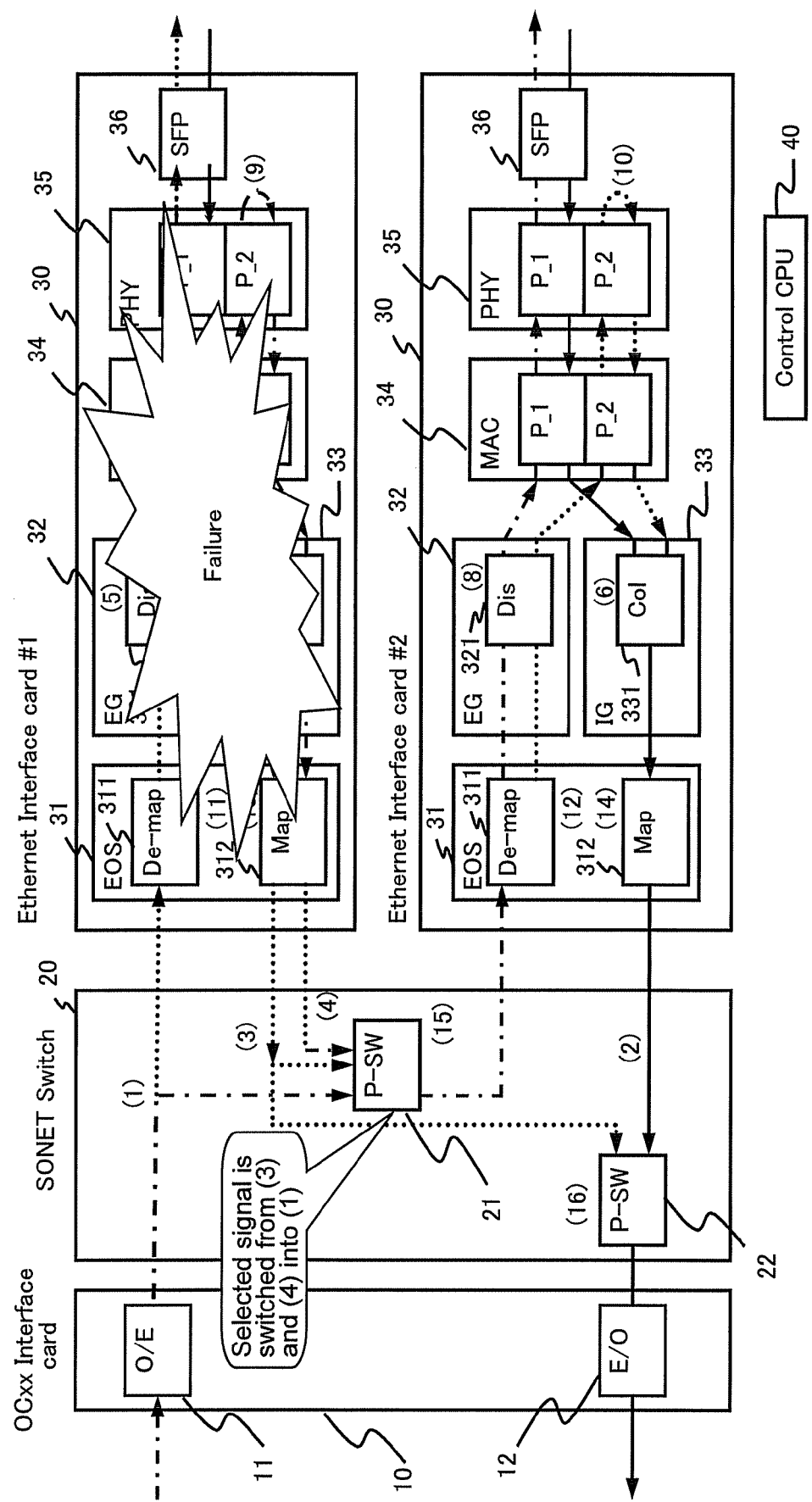
FIG. 7 is a diagram showing an example of operation in a case that a device failure occurs in an E-IF card #1 provided in a SONET device shown in FIG. 4.

FIG. 7 is a diagram showing an example of operation in a case that a device failure (card failure) occurs in the E-IF card #1 provided in the SONET device shown in FIG. 4. In FIG. 7, the SONET switch 20 connects the EOS signal from the OCxx interface card 10 to the path switch 21 in place of the E-IF card #1 in accordance with an instruction from the control CPU 40 when a card failure in the E-IF card #1 is detected by, for example, the control CPU 40. Further, the path switch 21 of the SONET switch 20 switches the to-be-outputted selected signal from the EOS signals ((3) and (4) in FIG. 7) outputted from the E-IF card #1 into the EOS signal ((1) in FIG. 7) outputted from the OCxx interface card 10.

As a result, the E-packets that were outputted from the E-IF card #1 before the occurrence of the card failure are outputted from the E-IF card #2 without going through the E-IF card #1. At that time, setting change is not performed for the E-IF card #2. Thus, the E-packets inputted to the E-IF card #2 are outputted to the SONET network via a path similar to that used in a normal state.

As such, communication with the packet switch device P (FIG. 3) can be continued through the E-IF card #2 even when a card failure occurs in the E-IF card #1. Here, in this case, the packet switch device P stops the packet transmission to the E-IF card #1, and sends the E-packets to the E-IF card #2.

The operation performed at the time of a device failure in the E-IF card #2 is described below.

Figure 8:
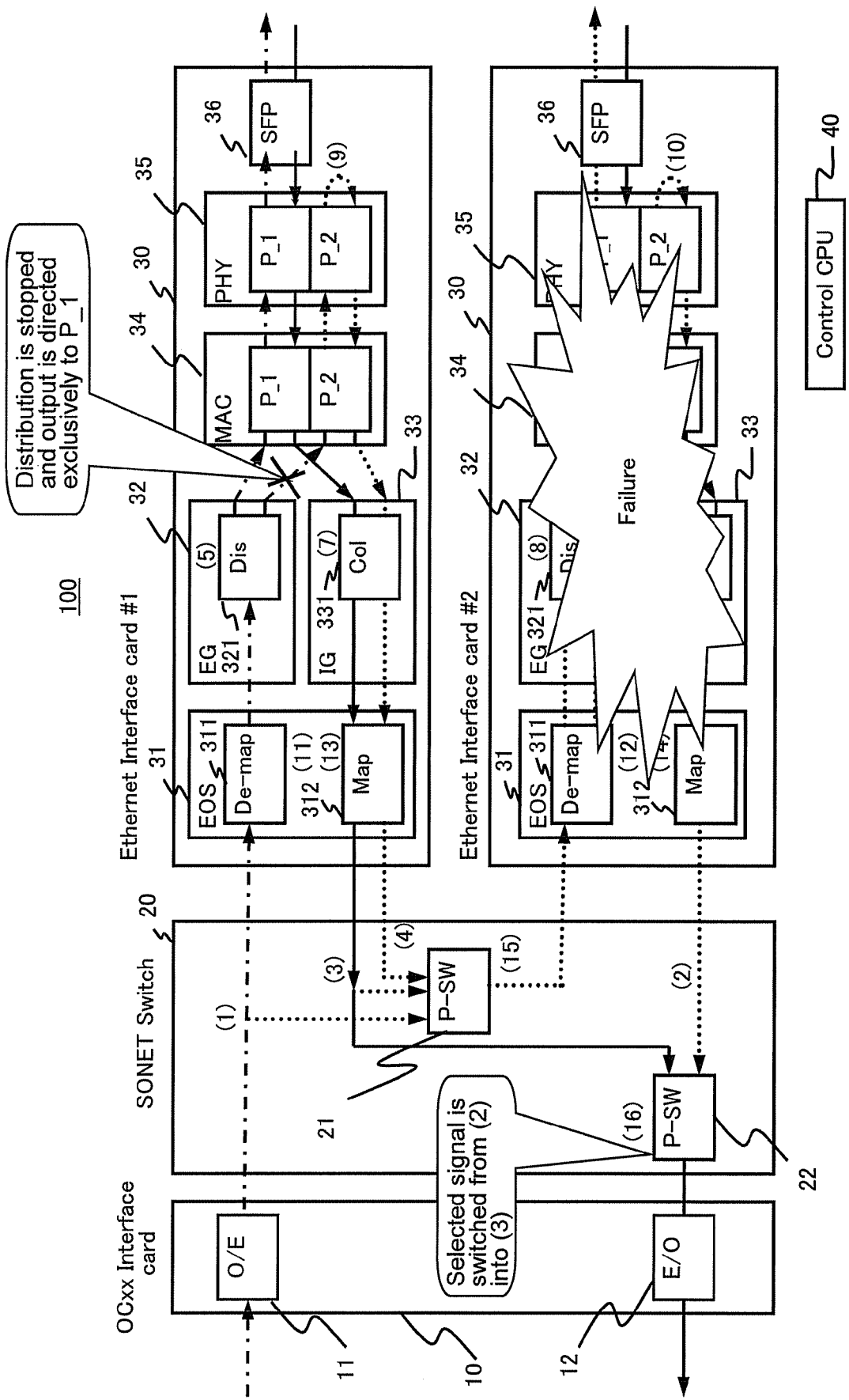
FIG. 8 is a diagram showing an example of operation in a case that a device failure occurs in an E-IF card #2 provided in a SONET device shown in FIG. 4.

FIG. 8 is a diagram showing an example of operation if a device failure (card failure) occurs in the E-IF card #2 provided in the SONET device shown in FIG. 4. In FIG. 8, the control CPU 40 sets up the distribution section 321 ((5) in FIG. 8) of the E-IF card #1 to stop the distribution and output the E-packets to the port P_1 of the MAC section 34 when a card failure in the E-IF card #2 is detected by, for example, the control CPU 40. This causes transition into a state in which the E-packets that were outputted from the E-IF card #2 before the occurrence of the card failure are outputted from the E-IF card #1.

Further, the SONET switch 20 connects the EOS signal from the E-IF card #1 to the path switch 22 in response to an instruction from, for example, the control CPU 40 when a card failure is detected in the E-IF card #2. Then, the path switch 22 selects the EOS signal from the E-IF card #1 in place of the EOS signal from the E-IF card #2 and outputs the EOS signal as the selected signal. As a result, the E-packets inputted to the E-IF card #1 are outputted to the SONET network without going through the E-IF card #2.

As such, communication with the packet switch device P (FIG. 3) can be continued through the E-IF card #1 even when a card failure occurs in the E-IF card #2. Here, in this case, the packet switch device P stops the packet transmission to the E-IF card #2, and sends the E-packets to the E-IF card #1.

According to the embodiment described above, the Cross Connect function and the path switch function provided in the SONET switch of the existing SONET device and the packet distribution and collection function based on the link aggregation technique provided in the existing E-IF card provide an Ethernet Protection® function (redundant configuration of the E-line) between E-IF cards (SONET switch). This improves the quality of the E-line.

Further, the band of the E-line can be enhanced when link aggregation is performed by using two E-lines provided between a SONET device and a packet switch device.

As described above, in the present embodiment, the configuration, the function, and the interface are not changed in the SONET switch 20 of the existing SONET device. Thus, the protection function can be realized at a low cost.

Further, according to the present embodiment, at the time of a card failure, the path is switched by the SONET Path Switch. This reduces the time necessary for changing the path.

Further, each of the MAC section and the PHY section has two ports. Then, a port P_1 is arranged on the first path, while a port P_2 is arranged on the second path. Then, a return connection to the port P_2 is provided. By virtue of this, E-packets distributed to the second path can be connected to the collection section 331 in a state that the E-packets have undergone the processing by the PHY section 35 and the MAC section 34.

Further, in the present embodiment, two E-IF cards having the same configuration are prepared. Thus, the collection section 331 of the IG section 33 of an E-IF card #1 is invalidated, while the distribution section of the EG section 32 of the E-IF card #1 is invalidated. This avoids the necessity of preparing two E-IF cards having mutually different hardware configurations, and hence permits cost reduction.

The above-mentioned embodiment has been given for an exemplary configuration in which each of the E-IF cards #1 and #2 has two ports. Another embodiment described below is given for a case in which E-IF cards having four ports are applied. This embodiment has configuration that is a partly common to the above-mentioned embodiment. Thus, their differences are described mainly, whereas description of the common points is omitted.

Figure 9:
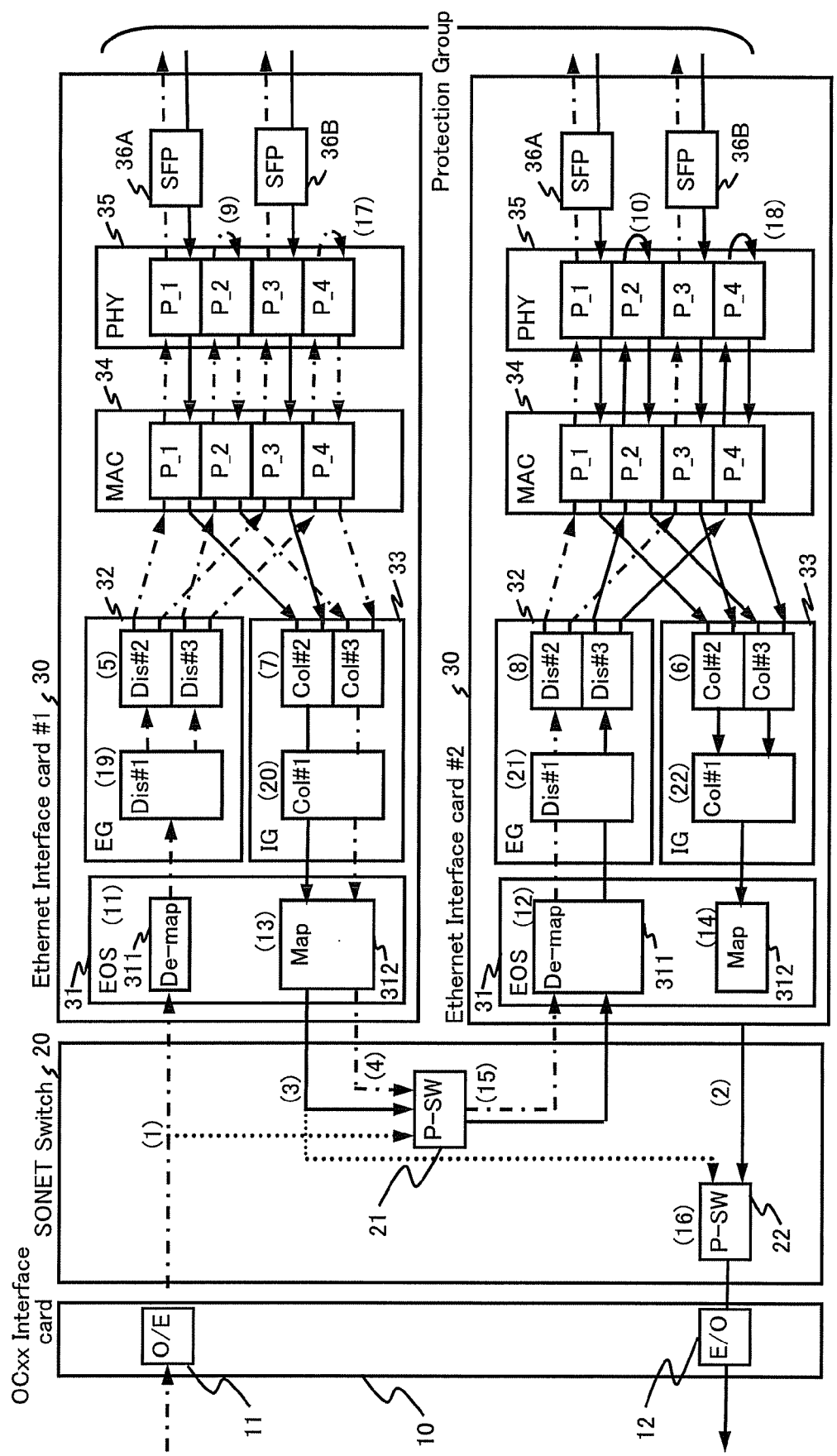
FIG. 9 is a diagram showing an exemplary configuration (four-port configuration) of a SONET device according to a second embodiment.

FIG. 9 is a diagram showing an exemplary configuration of a SONET device according to the another embodiment. The SONET device 100A shown in FIG. 9 is applicable to, for example, the network configuration shown in FIG. 3. Here, in contrast to the case of FIG. 3, each of the SONET device and the packet switch device has four E-IF cards. Then, corresponding E-IF cards are connected respectively. In other words, the SONET device and the packet switch device are in a state of being connected through four E-lines.

The configuration of the OCxx interface card 10 and the SONET switch 20 in the SONET device 100A shown in FIG. 9 is the same as that in the above-mentioned embodiment. Further, the configuration of the EOS section 31 is the same in the individual E-IF cards 30 (#1 and #2). Furthermore, the connection state ((1) to (4) in FIG. 9) implemented by the Cross Connect function in the SONET switch 20 and the path switches 21 and 22 is similar to that in the above-mentioned embodiment. Thus, their description is omitted.

In contrast, the E-IF cards #1 and #2 have the following different points from the above-mentioned embodiment.

<1> Each EG section 32 has three distribution sections #1, #2, and #3 in place of a single distribution section (distributor) 321. The distribution section #1 is arranged on the EOS section 31 side, while the distribution sections #2 and #3 are arranged in parallel on the MAC section 34 side. The distribution section #1 can distribute the E-packets from the de-mapping section to two path directions (two directions). The distribution section #2 receives the E-packets distributed to one of the above-mentioned two directions, while the distribution section #3 receives the E-packets distributed to the other of the above-mentioned two directions. Each of the distribution sections #2 and #3 distributes the inputted E-packets to two path directions.

<2> Each IG section 33 has three collection sections #1, #2, and #3 in place of a single collection section (collector) 331. The collection section #1 is arranged on the EOS section 31 side, while the collection sections #2 and #3 are arranged in parallel on the MAC section 34 side. Each of the collection sections #2 and #3 collects the packets inputted from the MAC section 34 on a packet basis. The collection section #1 collects the packets inputted from the collection sections #2 and #3 on a packet basis, and then inputs the packets to the mapping section 312.

<3> The MAC section 34 has four ports P_1, P_2, P_3, and P_4 in place of two ports.

<4> The PHY section 35 has four ports P_1, P_2, P_3, and P_4 corresponding to the ports of the MAC section 34.

<5> Instead of the SFP section 36, two SFP sections 36A and 36B are provided. The SFP section 36A is connected to the port P_1 of the PHY section 35, while the SFP section 36B is connected to the port P_3 of the PHY section 35. Here, a return connection is provided ((9), (17), (10) and (18) in FIG. 9) in each of the ports P_2 and P_4 of the PHY section 35.

Here, the individual components of the E-IF cards #1 and #2 are connected to each other through the physical wiring provided in the E-IF cards #1 and #2.

In a normal state of the SONET device 100A (in which no failure is present), collection processing by the collection section #1 ((20) in FIG. 9) of the E-IF card #1 and distribution processing by the distribution section #1 ((21) in FIG. 9) of the E-IF card #2 are set up to be invalid. Thus, the collection section #1 and the distribution section #1 pass the E-packets through. The selection state of the path switches 21 and 22 in a normal state is the same as that of the first embodiment. That is, the path switch 21 selects the paths of (3) and (4) in FIG. 9, while the path switch 22 selects the path of (2) in FIG. 9.

Next, with reference to FIG. 9, description is given for the flow of the signal (EOS signal) from the SONET network and the signal (E-packets) from the packet network in a normal state of the SONET device 100A.

The flow of the signal from the SONET network is described below.

In a normal state, the EOS signal received from the SONET network by the OCxx interface card 10 is transferred through the SONET switch 20 to the E-IF card #1 by virtue of the Cross Connect function ((1) in FIG. 9) of the SONET switch 20. The EOS signal is converted into E-packets in the E-IF card #1 as a result of de-mapping performed by the de-mapping section 311 ((11) in FIG. 9).

The E-packets are inputted to the distribution section #1 ((19) in FIG. 9: first distribution section) of the EG section 32. The distribution section #1 distributes the E-packets to the two path directions (two directions). Thus, the E-packets are inputted to each of the distribution section #2 (second distribution section) and the distribution section #3 (third distribution section). Then, each of the distribution sections #2 and #3 distributes the E-packets to the two path directions. As a result, the E-packets from the EOS section 31 are distributed to the four path directions.

The distribution section #2 distributes the E-packets to the first and the second paths. The distribution section #3 distributes the E-packets to the third and the fourth paths. The E-packets distributed to the first path are inputted to the port P_1 of the MAC section 34. The E-packets distributed to the second path are inputted to the port P_3 of the MAC section 34. The E-packets distributed to the third path are inputted to the port P_2 of the MAC section 34. The E-packets distributed to the second path are inputted to the port P_4 of the MAC section 34.

The E-packets inputted to the port P_1 of the MAC section 34 go through the port P_1 of the PHY section 35, and then reach the SFP section 36A (first transmission and reception port). On the other hand, the E-packets inputted to the port P_3 of the MAC section 34 go through the port P_3 of the PHY section 35, and then reach the SFP section 36B (second transmission and reception port).

Each of the SFP sections 36A and 36B transmits the E-packets to the packet network. As such, the E-packets in the EOS signal from the SONET network are transferred through the E-IF card #1 to the packet network (packet switch device: FIG. 3).

On the other hand, the E-packets inputted to the port P_2 of the MAC section 34 go through the port P_2 of the PHY section 35. The E-packets are then inputted again into the port P_2 of the PHY section 35 through the return connection ((9) in FIG. 9). Then, the E-packets go through the port P_2 of the MAC section 34 and reach the collection section #3 (second collection section). Further, the E-packets inputted to the port P_4 of the MAC section 34 go through the port P_4 of the PHY section 35, and are then inputted again into the port P_4 of the PHY section 35 through the return connection ((17) in FIG. 9). Then, the E-packets go through the port P_4 of the MAC section 34 and reach the collection section #3 (second collection section).

The collection section #3 collects the E-packets that have arrived from the individual ports P_2 and P_4 of the MAC section 34, and inputs the packets to the collection section #1 ((20) in FIG. 9). The collection section #1 passes the E-packets through. Then, the E-packets are inputted to the mapping section 312 ((13) in FIG. 9). The mapping section 312 performs mapping of the E-packets into an EOS signal, and then sends the signal to the SONET switch 20.

In the SONET switch 20, the EOS signal (the signal in which the packets from the packet network are mapped) from the E-IF card #1 is inputted to the path switch 21 through the path (4) in FIG. 9 by virtue of the Cross Connect function. The EOS signal is then connected through the path switch 21 to the de-mapping section 311 ((12) in FIG. 9) of the E-IF card #2.

The de-mapping section 311 performs de-mapping from the EOS signal into E-packets. Then, the E-packets are inputted to the distribution section #1 ((21) in FIG. 9) of the EG section 32. The distribution section #1 passes through the E-packets from the de-mapping section 311. Then, the E-packets are inputted to the distribution section #2 (fourth distribution section).

The distribution section #2 distributes the E-packets to the two path directions, i.e., the fifth and the sixth paths. The E-packets distributed to the fifth path are inputted to the port P_1 of the MAC section 34. The E-packets distributed to the sixth path are inputted to the port P_3 of the MAC section 34.

The E-packets inputted to the port P_1 of the MAC section 34 go through the port P_1 of the PHY section 35, and then reach the SFP section 36A. The E-packets inputted to the port P_3 of the MAC section 34 go through the port P_3 of the PHY section 35, and then reach the SFP section 36B. Each of the SFP sections 36A and 36B sends the E-packets to the two E-lines.

As such, the E-packets in the EOS signal from the SONET network are transmitted from the transmission and reception sections (the SFP section 36A (third transmission and reception port) and the SFP section 36B (fourth transmission and reception port)) of the E-IF card #2 to the packet network (packet switch device: FIG. 3). Thus, in the second embodiment, the E-packets in the EOS signal are distributed and outputted to the four ports of the E-IF cards #1 and #2.

Next, the flow of the E-packets from the packet network is described below. In FIG. 9, the E-packets received by the SFP sections 36A (third transmission and reception port) and 36B (fourth transmission and reception port) of the E-IF card #2 are inputted through the ports P_1 and P_3 of the PHY section 35 and the MAC section 34 into the collection section #2 ((6) in FIG. 9: third collection section) of the IG section 33. After collecting the E-packets, the collection section #2 inputs the E-packets into the collection section #1 ((22) in FIG. 9: fifth collection section).

On the other hand, the E-packets received by the SFP sections 36A (first transmission and reception port) and 36B (second transmission and reception port) of the E-IF card #1 are inputted through the ports P_1 and P_3 of the PHY section 35 and the MAC section 34 into the collection section #2 ((7) in FIG. 9: first collection section) of the IG section 33. After collecting the E-packets, the collection section #2 inputs the E-packets into the collection section #1 ((20) in FIG. 9).

The collection section #1 passes the E-packets through. Then, the E-packets are inputted to the mapping section 312 ((13) in FIG. 9). The mapping section 312 maps the E-packets into an EOS signal. Then, the EOS signal is sent to the SONET switch 20. The EOS signal is inputted through the path (3) and the path switch 21 ((15) in FIG. 9) in the SONET switch 20 into the de-mapping section 311 ((12) in FIG. 9) of the E-IF card #2, and then converted into E-packets by de-mapping processing.

The E-packets go through the distribution section #1 ((21) in FIG. 9) of the EG section 32, and are then inputted to the distribution section #3 (fifth distribution section). The distribution section #3 distributes the E-packets to the two path directions, i.e., the seventh path and the eighth path. The E-packets distributed to the seventh path are inputted to the port P_2 of the MAC section 34. The E-packets distributed to the eighth path are inputted to the port P_4 of the MAC section 34.

The E-packets inputted to the port P_2 of the MAC section 34 go through the port P_2 of the PHY section 35, and are then inputted again into the port P_2 of the PHY section 35 ((10) in FIG. 9) through the return connection. Then, the E-packets are inputted through the port P_2 of the MAC section 34 into the collection section #3 (fourth collection section).

The E-packets inputted to the port P_4 of the MAC section 34 go through the port P_4 of the PHY section 35, and are then inputted again into the port P_4 of the PHY section 35 ((18) in FIG. 9) through the return connection. Then, the E-packets are inputted through the port P_4 of the MAC section 34 into the collection section #3 (fourth collection section).

The collection section #3 collects the E-packets, and then inputs the packets to the collection section #1 (fifth collection section). As such, the E-packets received by the E-IF card #1 and the E-packets received by the E-IF card #2 merge with each other in the collection section #1 of the E-IF card #2.

After collecting the E-packets, the collection section #1 inputs the E-packets to the mapping section 312 ((14) in FIG. 9). The mapping section 312 maps the E-packets into an EOS signal. Then, the signal is sent to the SONET switch 20. In the SONET switch 20, the EOS signal from the E-IF card #2 is inputted through (2) into the path switch 22 ((16) in FIG. 9). The path switch 22 sends the EOS signal as the selected signal to the OCxx interface card. In the OCxx interface card, the EOS signal is converted into the form of an optical signal by the E/O conversion device 12, and then sent to the SONET network.

As described above, the E-packets inputted to the total four ports consisting of the two ports of the E-IF card #1 and the two ports of the E-IF card #2 are collected and mapped into an EOS signal on a packet basis. Then, the signal is sent through the OCxx interface card 10 to the SONET network.

Next, the operation performed at the time of a link failure in the E-IF card #1 is described below.

Figure 10:
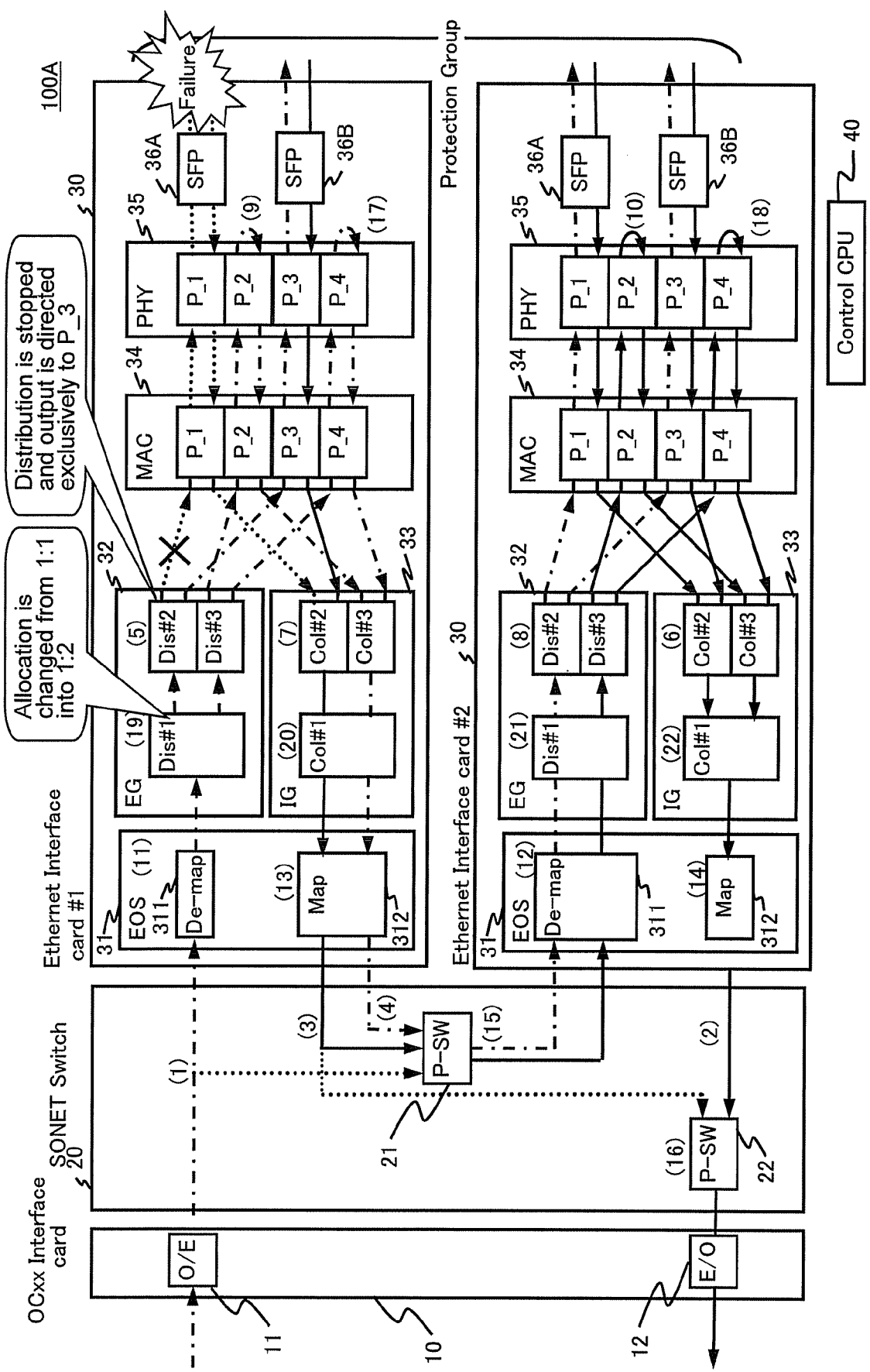
FIG. 10 is a diagram showing an example of operation in a case that a link failure occurs in an E-IF card #1 provided in a SONET device shown in FIG. 9.

FIG. 10 is a diagram showing an example of operation in a case that a link failure occurs in the E-IF card #1 provided in the SONET device 100A shown in FIG. 9. FIG. 10 shows a state that the link of the port P_1 for connecting the E-IF card #1 to the packet switch device (FIG. 3) is disconnected.

The link failure is detected by, for example, the control CPU 40. When detecting a link failure in the port P_1, the control CPU 40 sets the distribution section #2 ((5) in FIG. 10) of the EG section 32 to stop the distribution and output the E-packets to the port P_3 of the MAC section 34. Further, the control CPU 40 performs setting change for the distribution section #1 ((19) in FIG. 10) such that the allocation of the E-packets to the distribution section #2 and the distribution section #3 should be changed from 1:1 (distribution is performed at a ratio of 1 to 1 for #2 and #3, respectively) into 1:2 (distribution is performed at a ratio of 1 to 2 for #2 and #3, respectively).

This causes transition into a state that the E-packets that were outputted from the port P_1 of the E-IF card #1 before the occurrence of a link failure are outputted from the port P_3 of the E-IF card #1 and the ports P_1 and P_3 of the E-IF card #2.

Further, the input of E-packets received through the port P_1 of the E-IF card #1 in the collection section #2 of the E-IF card #1 ((7) in FIG. 10), which had been inputted before the occurrence of a link failure, disappears. However, the E-packets received through the port P_2 of the E-IF card #1 are inputted to the collection section #2 similarly to the situation before the occurrence of the link failure. Thus, setting change is not performed for the collection section #2. The operation in the other blocks is similar to that in a normal state.

As described above, the E-packets in the EOS signal are sent to the packet network through the other port of the E-IF card #1 and the two ports P_1 and P_3 of the E-IF card #2 when a link failure concerning any one of the two ports occurs in the E-IF card #1. By virtue of this, communication with the packet network is continued.

Here, the control CPU 40 performs setting change for the collection section #2 ((5) in FIG. 10) such that the distribution is stopped and the E-packets are outputted to the port P_1 when a link failure concerning the port P_3 of the E-IF card #1 occurs. Here, the setting change for the distribution allocation in the distribution section #1 ((19) in FIG. 10) is the same as that at the time of a link failure in the port P_1 (1:2 (distribution is performed at a ratio of 1 to 2 for #2 and #3, respectively)).

Next, the operation performed at the time of a link failure in the E-IF card #2 is described below.

Figure 11:
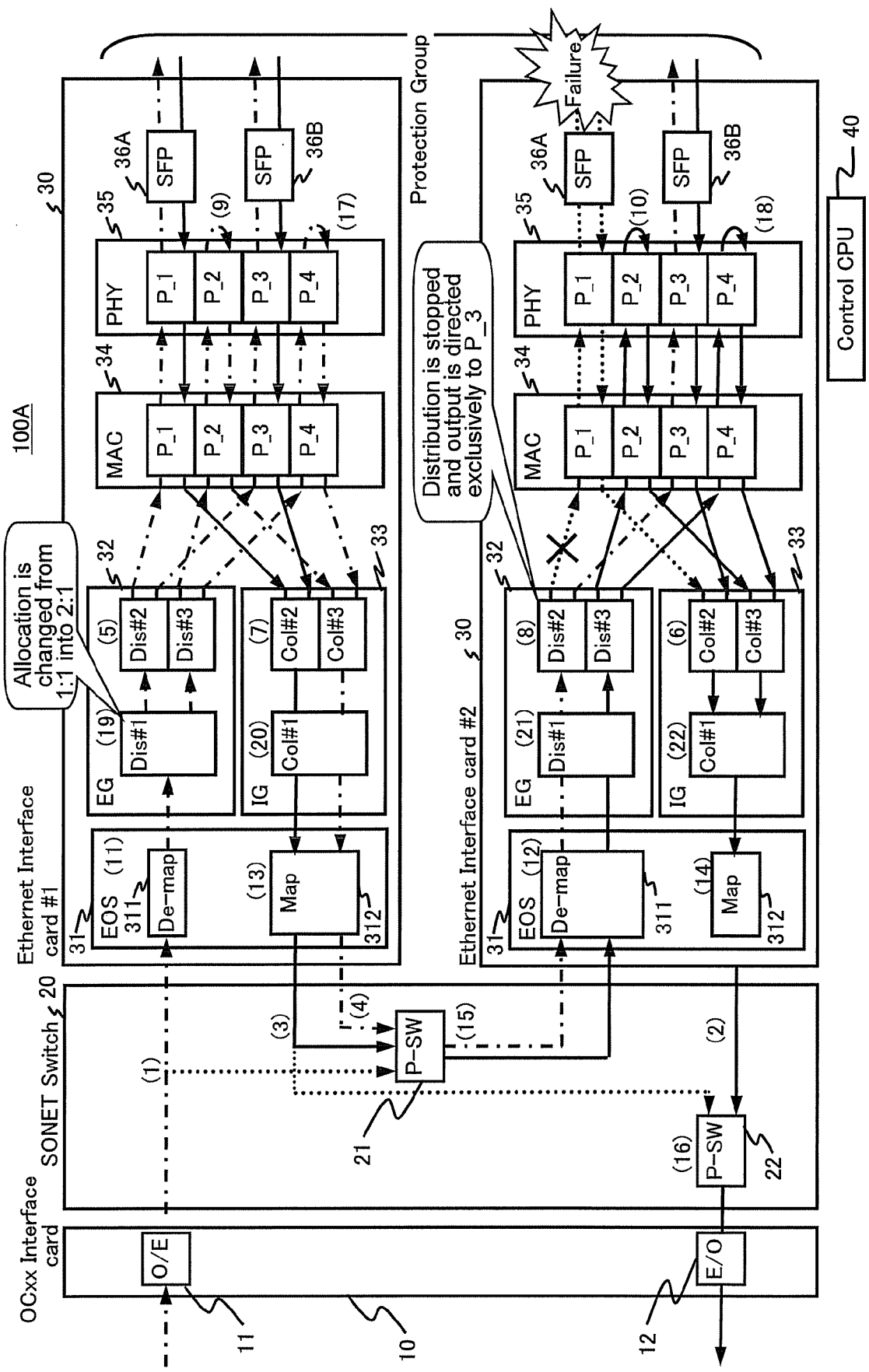
FIG. 11 is a diagram showing an example of operation in a case that a link failure occurs in an E-IF card #2 provided in a SONET device shown in FIG. 9.

FIG. 11 is a diagram showing an example of operation when a link failure occurs in the E-IF card #2 provided in the SONET device 100A shown in FIG. 9. FIG. 11 shows a state in which the link of the port P_1 for connecting the E-IF card #2 to the packet switch device (FIG. 3) is disconnected.

The link failure is detected by, for example, the control CPU 40. The control CPU 40 performs setting change for the distribution section #2 ((8) in FIG. 11) of the EG section 32 to stop the distribution and output the E-packets to the port P_3 of the MAC section 34 when a link failure is detected in the port P_1. Further, the control CPU 40 performs setting change for the distribution section #1 ((19) in FIG. 11) of the E-IF card #1 such that the allocation of the E-packets to the distribution sections #2 and #3 is changed from 1:1 (distribution is performed at a ratio of 1 to 1 for #2 and #3, respectively) to 2:1 (distribution is performed at a ratio of 2 to 1 for #2 and #3, respectively). As a result, the E-packets that were outputted from the E-IF card #2 before the occurrence of the failure are outputted from the E-IF card #1.

Further, the input of the E-packets (E-packets received through the port P_1 of the E-IF card #2) from the port P_1 of the MAC section 34 in the collection section #2 ((6) in FIG. 11) of the E-IF card #2 disappears after the occurrence of the link failure. However, the E-packets received through the port P_2 of the E-IF card #2 are inputted to the collection section #2 similarly to the situation before the occurrence of the failure. Thus, setting change is not performed for the collection section #2.

As described above, the E-packets in the EOS signal are sent to the packet network through the other port of the E-IF card #2 and the two ports P_1 and P_3 of the E-IF card #1 when a link failure concerning any one of the two ports occurs in the E-IF card #2. By virtue of this, communication with the packet network is continued.

Here, the control CPU 40 performs setting change for the distribution section #2 ((8) in FIG. 11) such that the distribution is stopped and that the E-packets are outputted to the port P_1 when a link failure concerning the port P_3 of the E-IF card #2 occurs. Here, the setting change for the distribution allocation in the distribution section #1 ((19) in FIG. 11) is the same as that at the time of a link failure in the port P_1 (2:1 (distribution is performed at a ratio of 2 to 1 for #2 and #3, respectively)).

Next, the operation performed at the time of a device failure in the E-IF card #1 is described below.

Figure 12:
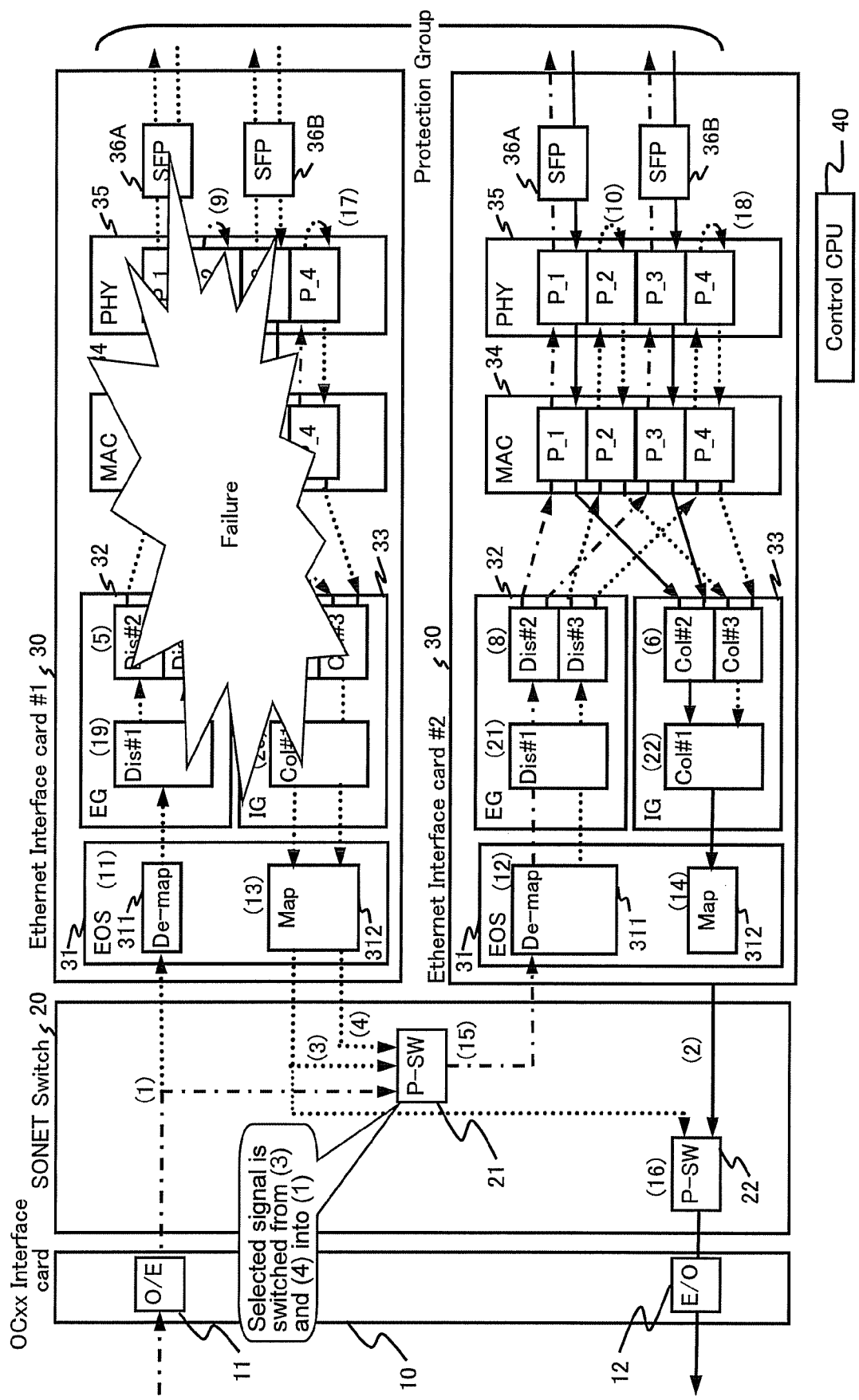
FIG. 12 is a diagram showing an example of operation in a case that a device failure occurs in an E-IF card #1 provided in a SONET device shown in FIG. 9.

FIG. 12 is a diagram showing an example of operation in a case that a device failure (card failure) occurs in the E-IF card #1 provided in the SONET device 100A shown in FIG. 9. The card failure in the E-IF card #1 is detected by, for example, the control CPU 40. The SONET switch 20 connects the EOS signal from the OCxx interface card 10 to the path switch 21 ((15) in FIG. 12) by virtue of the Cross Connect function in accordance with an instruction from, for example, the control CPU when the card failure is detected. Then, the path switch 21 connects the EOS signal to the de-mapping section 311 ((12) in FIG. 12) of the E-IF card #2 (switches the selected signal from (3) and (4) into (1) in FIG. 12). This causes transition into a state in which the E-packets that were outputted (transmitted) from the E-IF card #1 before the occurrence of the card failure are outputted from the E-IF card #2.

In contrast, the E-packets inputted to the E-IF card #2 are sent through the collection section #2 and the collection section #1 to the SONET switch 20 without setting change for the individual block.

As described above, the EOS signal is sent to the E-IF card #2 instead of the E-IF card #1 when a card failure occurs in the E-IF card #1. By virtue of this, the SONET device 100A can continue communication with the packet network (packet switch device: FIG. 3).

Next, the operation performed at the time of a device failure in the E-IF card #2 is described below.

Figure 13:
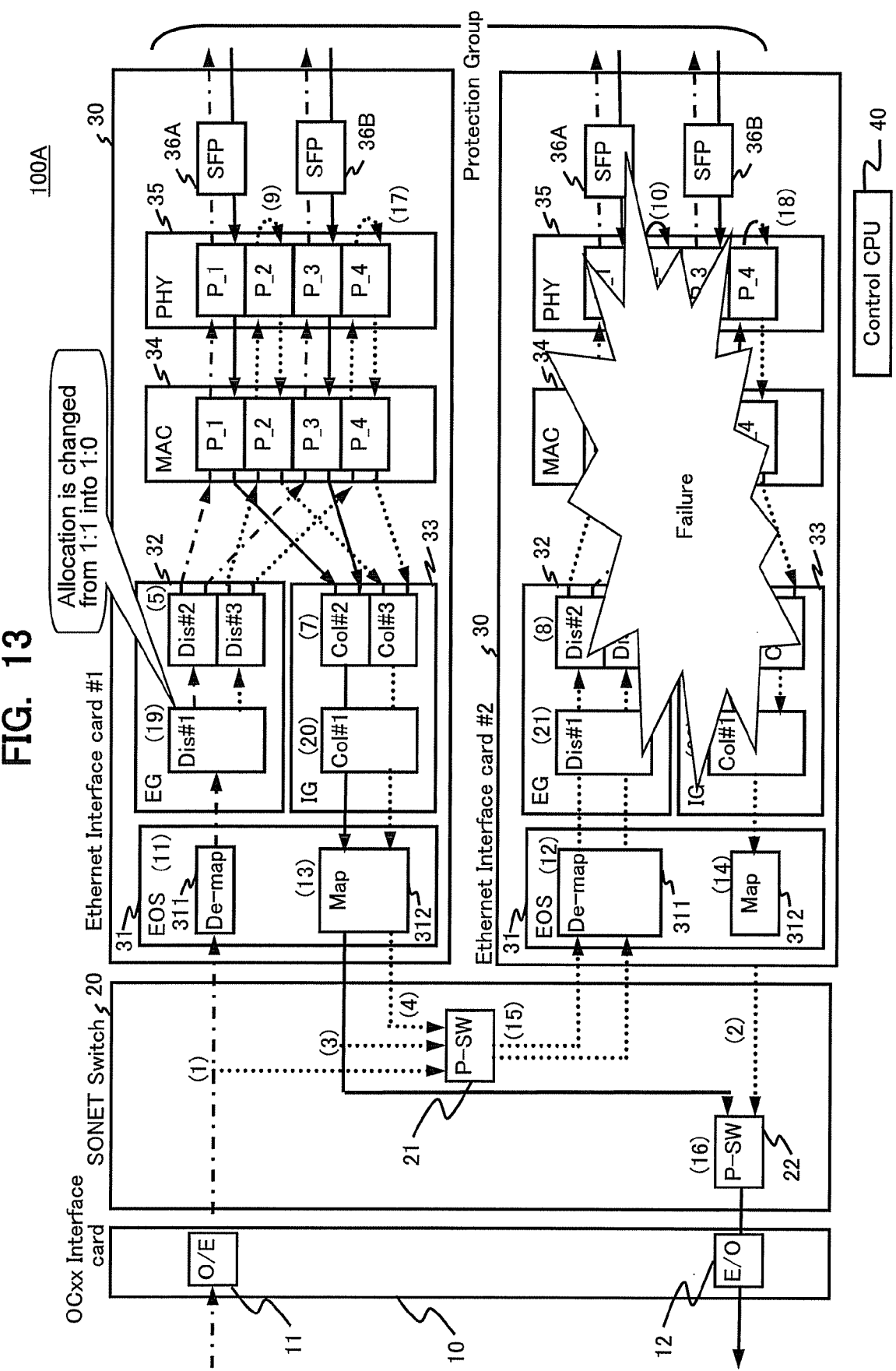
FIG. 13 is a diagram showing an example of operation in a case that a device failure occurs in an E-IF card #2 provided in a SONET device shown in FIG. 9.

FIG. 13 is a diagram showing an example of operation in a case that a device failure (card failure) occurs in the E-IF card #2 provided in the SONET device 100A shown in FIG. 9. The card failure in the E-IF card #2 is detected by, for example, the control CPU 40. When the card failure is detected, the control CPU 40 performs setting change for the distribution section #1 of the EG section 32 of the E-IF card #1 such that the distribution allocation to the distribution sections #2 and #3 is changed from 1:1 into 1:0 (distribution is performed at a ratio of 1 to 0 for #2 and #3, respectively). This causes transition into a state in which the E-packets that were outputted from the E-IF card #2 before the occurrence of the failure are outputted from the E-IF card #1.

Further, the output from the mapping section 312 of the E-IF card #1 in the SONET switch 20 is connected to the path switch 22 ((16) in FIG. 13) in accordance with an instruction from, for example, the control CPU 40 when a card failure is detected in the E-IF card #2. Further, the path switch 22 selects as the selected signal the path (3) (E-IF card #1) in place of the path (2) (E-IF card #2). This causes transition into a state that the E-packets received by the E-IF card #1 are sent to the SONET network without going through the E-IF card #2.

As described above, the EOS signal is sent to the E-IF card #1 instead of the E-IF card #2 when a card failure occurs in the E-IF card #2. By virtue of this, the SONET device 100A can continue communication with the packet network (packet switch device: FIG. 3).

According to the above-mentioned embodiments (SONET device 100A), similar effect to that of the preceding embodiment is obtained. Here, the configurations shown in these embodiments may be changed appropriately without departing from the purpose of the present invention.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A transmission device comprising:
   a synchronous transmission network interface section;
   a switch section connected to said synchronous transmission network interface section; and
   first and second LAN interface sections respectively connected to said switch section, wherein
   said first LAN interface section includes:
   a de-mapping section for de-mapping a signal which is inputted from said switch section and in which packets are mapped and thereby obtaining packets from the signal;
   a distribution section for distributing the packets obtained in said de-mapping section to first and second paths;
   a transmission and reception section that transmits and receives packets to and from a packet network and includes a first transmission and reception port for transmitting the packets arriving through said first path to a packet network; and
   a mapping section that maps into said signal both of the packets received from said packet network through said first transmission and reception port and the packets distributed to said second path, and then sends the signal to said switch section, wherein
   said second LAN interface section includes:
   a de-mapping section that de-maps said signal which is inputted from said switch and in which the packets from said packet network are mapped and said signal in which the packets distributed to said second path are mapped, then sends to a third path the packets distributed to said second path and sends to a fourth path the packets from said packet network;
   a transmission and reception section that transmits and receives packets to and from said packet network and includes a second transmission and reception port for transmitting the packets arriving through said third path to said packet network;
   a collection section for collecting the packets received from said packet network through said second transmission and reception port and the packets sent to said fourth path; and
   a mapping section for mapping into said signal the packets collected by said collection section and then sending the signal to said switch section, and wherein
   when no failure is present in both of said first and second LAN interface sections, said switch section transfers said signal received from a synchronous transmission network by said synchronous transmission network interface section to the de-mapping section of said first LAN interface section, transfers both of said signal which is inputted from the mapping section of said first LAN interface section and in which the packets from said packet network are mapped and said signal in which the packets distributed to said second path are mapped to the de-mapping section of said second LAN interface section, and transfers said signal inputted from the mapping section of said first LAN interface section to said synchronous transmission network interface section.

2. The transmission device according to claim 1, wherein said distribution section stops distribution to said first path and sends the packets to said second path when a link failure is detected in said first LAN interface section.

3. The transmission device according to claim 1, wherein said distribution section stops distribution to said second path and sends the packets to said first path when a link failure is detected between said first LAN interface section and the packet network.

4. The transmission device according to claim 1, wherein said switch section does not input said signal inputted from said synchronous transmission network interface section to said de-mapping section of said first LAN interface section when a device failure is detected in said first LAN interface section, and inputs the signal to said de-mapping section of said second LAN interface section.

5. The transmission device according to claim 1, wherein said switch does not input said signal inputted from the mapping section of said first LAN interface section to said second LAN interface section when a device failure is detected in said second LAN interface section, and inputs the signal to said synchronous transmission network interface section, while said distribution section of said first LAN interface section stops packet distribution to said second path and sends the packets to said first path.

6. A transmission device comprising:
a synchronous transmission network interface section; and
a switch section connected to said synchronous transmission network interface section; and
first and second LAN interface sections respectively connected to said switch section, wherein
said first LAN interface section includes:
a first de-mapping section for de-mapping a signal which is inputted from said switch section and in which packets are mapped and thereby obtaining packets from the signal;
a first distribution section for distributing the packets obtained in said first de-mapping section in two directions;
a second distribution section for distributing the packets distributed to one of said two directions by said first distribution section to first and second paths;
a third distribution section for distributing the packets distributed to the other one of said two directions by said first distribution section to third and fourth paths;
a transmission and reception section including two transmission and reception ports that transmit and receive the packets to and from said packet network and that comprise a first transmission and reception port for sending the packets received through said first path to said packet network and a second transmission and a reception port for sending the packets received through said third path to said packet network;
a first collection section for collecting the packets received from said packet network by said first and second transmission and reception ports;
a second collection section for collecting the packets distributed to said second and fourth paths; and
a mapping section that maps respectively the packets collected by said first collection section and the packets collected by said second collection section into said signal and then sends the signals to said switch section, wherein
said second LAN interface section includes:
a second de-mapping section that de-maps the signal which is inputted from said switch section and in which the packets collected by said first collection section are mapped and the signal in which the packets collected by said second collection section are mapped, and thereby obtains packets from each signal;
a fourth distribution section for distributing the packets collected by said first collection section and obtained by said second de-mapping section to fifth and sixth paths;
a fifth distribution section for distributing the packets collected by said second collection section and obtained by said second de-mapping section to seventh and eighth paths;
a transmission and reception section including two transmission and reception ports that transmit and receive the packets to and from said packet network and that comprise a third transmission and reception port for sending to said packet network the packets received through said fifth path and a fourth transmission and reception port for sending the packets received through said seventh path to said packet network;
a third collection section for collecting the packets received from said packet network by said third and fourth transmission and reception ports;
a fourth collection section for collecting the packets distributed to said sixth and eighth paths;
a fifth collection section for collecting the packets collected by said third collection section and the packets collected by said fourth collection section; and
a mapping section for mapping into said signal the packets collected by said fifth collection section and then sending the signal to said switch section, and wherein
when no failure is present in both of said first and second LAN interface sections, said switch section transfers said signal received from said synchronous transmission network by said synchronous transmission network interface section to the first de-mapping section of said first LAN interface section, transfers both of said signal which is inputted from the mapping section of said first LAN interface section and in which the packets collected by said first collection section are mapped and said signal in which the packets collected by said second collection section are mapped to the second de-mapping section of said second LAN interface section, and transfers said signal inputted from the mapping section of said first LAN interface section to said synchronous transmission network interface section.

7. The transmission device according to claim 6, wherein said second collection section stops packet distribution to said first path and sends the packets to said second path when a link failure occurs concerning said first transmission and reception port of said first LAN interface section.

8. The transmission device according to claim 7, wherein distribution allocation for the packets to said two directions is changed in said first distribution section such that the amount of distribution to said third collection section should be greater than the amount of distribution to said second collection section.

9. The transmission device according to claim 6, wherein said second collection section stops packet distribution to said second path and sends the packets to said first path when a link failure occurs concerning said second transmission and reception port of said first LAN interface section.

10. The transmission device according to claim 6, wherein said fourth collection section stops packet distribution to said fifth path and sends the packets to said sixth path when a link failure occurs concerning said third transmission and reception port of said second LAN interface section.

11. The transmission device according to claim 10, wherein distribution allocation for the packets to said two directions is changed in said first distribution section such that the amount of distribution to said second collection section should be greater than the amount of distribution to said third collection section.

12. The transmission device according to claim 6, wherein said fourth collection section stops packet distribution to said sixth path and sends the packets to said fifth path when a link failure occurs concerning said fourth transmission and reception port of said second LAN interface section.

13. The transmission device according to claim 6, wherein said switch section does not transfer said signal inputted from said synchronous transmission network interface section to said first LAN interface section when a device failure occurs in said first LAN interface section, and transfers the signal to said second LAN interface section.

14. The transmission device according to claim 6, wherein said switch section does not transfer said signal which is inputted from said first LAN interface section and in which the packets from the packet network are mapped to said second LAN interface section when a device failure occurs in said second LAN interface section, and transfers the signal to said synchronous transmission network interface section.

15. A synchronous transmission network transmission device comprising:
    a synchronous transmission network interface section;
    first and the second LAN interface sections each including a transmission and reception section for transmitting and receiving packets to and from a packet network, a mapping section for mapping the packets into a synchronizing signal, and a de-mapping section for extracting the packets from the synchronizing signal; and
    a switch section for performing transfer processing on said signal between said synchronous transmission network interface section and said first and second LAN interface sections, wherein
    said switch section transfers said synchronizing signal inputted from said synchronous transmission network interface section to said first LAN interface section,
    said first LAN interface section transmits a part of the packets contained in the synchronizing signal inputted from said switch section through said transmission and reception section to said packet network, and maps the other packets contained in said synchronizing signal into said synchronizing signal and then sends the signal to said switch section,
    said switch section transfers said synchronizing signal inputted from said first LAN interface section to said second LAN interface section, and
    said second LAN interface section transmits the packets contained in said synchronizing signal inputted from said switch section through said transmission and reception section to said packet network.

16. The transmission device according to claim 15, wherein
    said first LAN interface section maps the packets received from said packet network by said transmission and reception section into a synchronizing signal, and then sends the signal to said switch section,
    said switch section transfers said synchronizing signal inputted from said first LAN interface section to said second LAN interface section,
    said second LAN interface section collects the packets contained in said synchronizing signal transferred from said switch section and the packets received from said packet network by said transmission and reception section, then maps the packets into a synchronizing signal, and then sends the signal to said switch section, and
    said switch section transfers said synchronizing signal sent from said second LAN interface section to said synchronous transmission network interface section.

* * * * *

UNITED STATES PATENT AND TRADEMARK OFFICE
CERTIFICATE OF CORRECTION

| | | |
|---|---|---|
| PATENT NO. | : 7,995,463 B2 | Page 1 of 1 |
| APPLICATION NO. | : 12/216378 | |
| DATED | : August 9, 2011 | |
| INVENTOR(S) | : Hiroyuki Honma | |

It is certified that error appears in the above-identified patent and that said Letters Patent is hereby corrected as shown below:

Column 16, Line 38, In Claim 1, delete "path to a" and insert --path to said--, therefor.

Column 17, Line 66 (Approximately), In Claim 6, delete "said packet network" and insert --a packet network--, therefor.

Column 18, Line 56 (Approximately), In Claim 6, delete "said synchronous transmission" and insert --a synchronous transmission--, therefor.

Signed and Sealed this
Third Day of April, 2012

David J. Kappos
*Director of the United States Patent and Trademark Office*